United States Patent [19]
Maebashi

[11] Patent Number: 5,098,571
[45] Date of Patent: Mar. 24, 1992

[54] CERAMIC FILTER AND PROCESS FOR MAKING IT

[75] Inventor: Nobuyuki Maebashi, Kanagawa, Japan

[73] Assignee: Toto Ltd., Fukuoka, Japan

[21] Appl. No.: 616,355

[22] Filed: Nov. 21, 1990

[30] Foreign Application Priority Data

Aug. 20, 1990 [JP] Japan .................................. 2-218542

[51] Int. Cl.$^5$ ........................ B01D 33/21; B01D 24/00
[52] U.S. Cl. ......................... 210/500.23; 210/500.25; 210/504; 210/506; 210/510.1; 264/45.1; 264/60
[58] Field of Search .................... 210/500.25, 503, 509, 210/510.1, 500.23, 223.1, 223.2, 504; 264/43, 45.5, 45.1, 44, 60

[56] References Cited

U.S. PATENT DOCUMENTS

| | | | |
|---|---|---|---|
| 4,652,411 | 3/1987 | Swarr et al. | 264/43 |
| 4,839,049 | 6/1989 | Kinney, Jr. et al. | 210/510.1 |
| 4,929,406 | 5/1990 | Abe et al. | 264/45.5 |
| 4,981,590 | 6/1991 | Van 'T Veen et al. | 210/500.26 |
| 4,983,423 | 1/1991 | Goldsmith | 210/510.1 |

FOREIGN PATENT DOCUMENTS

| | | | |
|---|---|---|---|
| 1174917 | 8/1986 | Japan | 210/510.1 |
| 2168336 | 6/1986 | United Kingdom | 210/510.1 |

Primary Examiner—Robert A. Dawson
Assistant Examiner—Ana Fortuna
Attorney, Agent, or Firm—Howard L. Rose

[57] ABSTRACT

A process for manufacturing a ceramic filter having a given pore size required as a filter membrane and also having superior alkali resistance and acid resistance. The filter of the present invention is produced by preparing an aggregate comprising alumina coarse particles and a sintering aid comprising alumina-zirconia mixed particles containing not more than 90 wt. % of alumina, blending said alumina coarse particles and alumina-zirconia mixed particles so as for alumina to be in an amount of from 80 to 99 wt. % based on the total weight of the starting materials, forming the blended starting materials to have a desired shape, and firing the formed product.

15 Claims, 3 Drawing Sheets

CERAMIC FILTER AND PROCESS FOR MAKING IT

BACKGROUND OF THE INVENTION

1. Field of the Invention

The present invention relates to a ceramic filter utilized in the production of food, drink, pharmaceuticals and so forth. It also relates to a process for manufacturing the same.

2. Description of The Related Art

In food industries or pharmaceutical industries, ultrafiltration or the like using ceramic filters has been hitherto carried out to remove unwanted substances included in stock solutions or to concentrate given substances in stock solutions.

Such ceramic filters gradually are plugged with their use because of organic matters such as proteins, resulting in a lowering of filtering performance. Accordingly, as a conventional means, ceramic filters are washed with an alkali or an acid to remove organic matters so that the filtering performance can be restored.

Since, however, ceramic filters contain not only $Al_2O_3$ as a main component but also alkali- or acid-soluble components such as $SiO_2$, $CaO$ and $Na_2O$, and these components are dissolved out as a result of washing to bring about a great lowering of the performance.

To eliminate the above disadvantages, Japanese Laid-open Patent Application No. 59-225716 proposes to produce a filter using alumina with a high purity of 99.9% or more, and Japanese Laid-open Patent Application No. 63-197510 proposes to add $MgO$ and $ZrO_2$ as sintering aids.

Of the above methods, the method in which alumina with a high purity is used makes it necessary to carry out sintering at a high temperature and requires a special sintering furnace. In addition, alumina coarse particles of from 20 to 30 μm in particle diameter must be sintered in order to obtain a filter of about 10 μm in pore size. In such an instance, no sufficient strength can be obtained even if $MgO$ and $ZrO_2$ are added as sintering aids, unless the sintering is carried out at a high temperature of 1,800° C. or more.

SUMMARY OF THE INVENTION

An object of the present invention is to solve the above problems the conventional ceramic filters have had.

In the process of the present invention, alumina coarse particles with a particle diameter of from 20 to 30 μm and alumina-zirconia mixed particles with a particle diameter of from 0.1 to 0.3 μm are blended so that alumina is present in an amount of from 80 to 99 wt. % based on the whole, and then the resulting mixture is formed to have a shape, followed by sintering.

Addition of a given amount of the alumina-zirconia mixed particles as a sintering aid to the alumina coarse particles makes it possible to obtain a ceramic filter having a high durability and a given pore size even if the sintering is carried out at a lower temperature.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
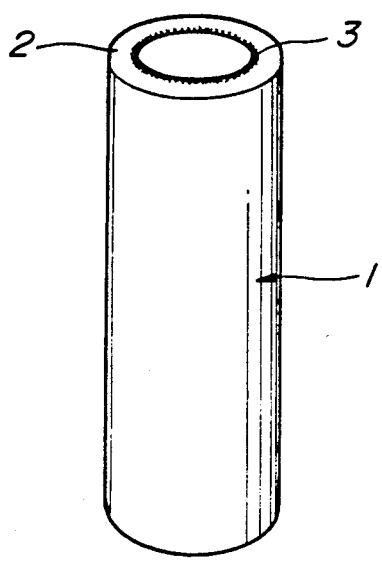
FIG. 1 is a perspective illustration of the whole of a ceramic filter according to an embodiment of the present invention.
Figure 2:
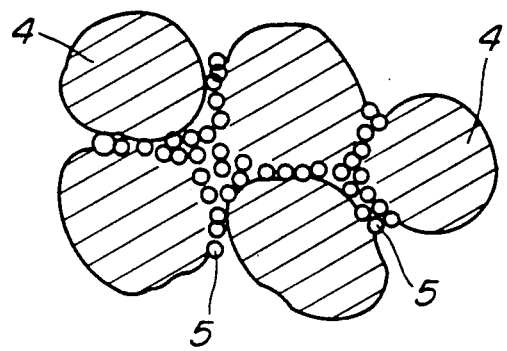
FIG. 2 is a partial enlarged illustration of the structure of a support of the ceramic filter shown in FIG. 1.

In an embodiment of the present invention, as shown in FIGS. 1 and 2, a ceramic filter 1 is in the form of a cylinder of from 200 mm to 1 m in length, from 5 mm to 25 mm in outer diameter, from 4 mm to 6 mm in inner diameter and from 0.5 mm to 3 mm in thickness. The outside part thereof forms a support 2 of about 10 μm in average pore size, and the inside part thereof forms a dense layer 3 having a smaller average pore size than the support 2.

A method of preparing the support 2 will be described first.

Alumina ($Al_2O_3$) coarse particles and alumina-zirconia ($Al_2O_3$—$ZrO_2$) mixed particles are made ready for use as starting materials. As shown in FIG. 2, alumina coarse particles 4 are used as an aggregate, and are so controlled as to have an average particle diameter of from 20 to 100 μm. When the particle diameter of the coarse alumina used as an aggregate is selected in the above range, the support 2 can be made to have an average pore size of from 0.05 μm to 100 μm after sintering. This average pore size can be readily controlled by selecting the particle diameter of the coarse alumina.

The alumina-zirconia mixed particles 5 are used as a sintering aid, and are controlled to have an average particle diameter of from 0.1 μm to 0.3 μm. The alumina coarse particles and the alumina-zirconia mixed fine particles are then blended in a proportion of, for example, 10:2 in weight ratio so that the alumina is in an amount of from 80 to 99 wt. % based on the total weight of the starting materials. Here, a mixture of materials such as aluminum hydroxide and zirconia oxychloride, capable of forming alumina and zirconia as a result of their oxidation, may be used as the alumina-zirconia mixed fine particles.

The starting materials may be blended using a stirring mixing machine such as a mixer. It is advantageous to use a method in which alumina fine particles and zirconium fine particles are mixed and dispersed in a solvent such as water in a given proportion using a ball mill to give a slurry and the resulting slurry is added to the alumina coarse particles described above, or a method in which alumina coarse particles and alumina-zirconia mixed fine particles are blended in a surface-fusing apparatus so that the alumina mixed fine particles are fusion-bonded.

Thereafter, to the above mixed powder, methyl cellulose and water are added as forming aids, which are then kneaded. The kneaded product is formed into a given shape by means of an extruder. The extruder product thus obtained is dried, and then sintered at a given temperature, e.g., 1,730° C. Suitable molding methods as exemplified by rubber pressing can also be utilized.

The form of the support 2 may not be limited to the hollow cylinder as shown in FIG. 1. The support may also be in any form such as a flat plate, a disc, or a solid cylinder or a round rod or square rod in which a number of through-holes are provided in its longitudinal direction.

Figure 3:
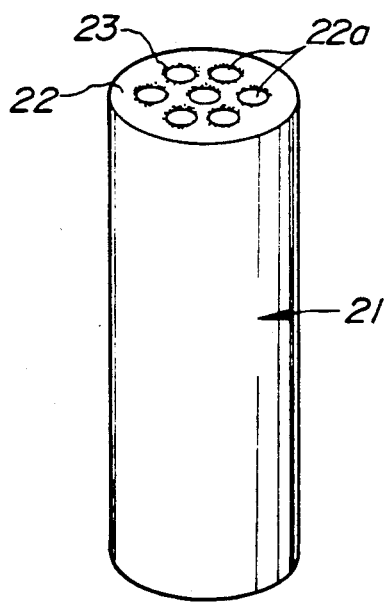
FIG. 3 is a perspective illustration of the whole of a ceramic filter according to another embodiment of the present invention.

FIG. 3 illustrate a filter 21 comprised of a support 22 provided with a number of through-holes 22a in its longitudinal direction and a dense layer 23 formed on each inner wall surface of the through holes 22a.

Next, a slurry in which particles with a smaller diameter than the particles that constitute the support 2 have been dispersed is coated on the surface from which a substrate solution is flowed in, i.e. on the inner wall surface of the support 2 in the present embodiment. After drying, the coatings formed are baked at a given temperature. A slurry may further be coated on the inner wall surface of the support 2 in the same manner, followed by drying and then baking at a given temperature so that the dense layer can be formed in multiple laminated layers.

The dense layer 3 having pores with a pore size of from 0.05 μm to 20 μm is formed in this way on the inner wall surface of the support 2.

In order to form on the inner wall surface of this support a dense layer of 500 Å or less, at least one kind of particles selected from particles of $SnO_2$, $TiO_2$, $ZrO_2$ or $CeO_2$ are made into a slurry-like sol, which is then coated thereon. Here, the sol may be prepared in a concentration of from 0.25 to 5 wt. % in terms of oxide. The particles constituting the sol may have a diameter of 35 Å or 80 Å in respect of $SnO_2$, 100 Å in respect of $TiO_2$, 140 Å in respect of $ZrO_2$ and 50 Å in respect of $CeO_2$, in approximation.

After the sol is applied to the inner wall surface of the support 2 in the manner as described above, the sol is dehydrated into a gel. Then, the resulting gel is dried and thereafter baked to form the dense layer 3.

The dense layer 3 may be baked at a temperature ranging from 400° C. to 900° C., so that the particles in the dense layer can be made to have a particle diameter of not more than 500 Å, or may be baked at a temperature ranging from 300° C. to 800° C., so that the particles can be made to have a particle diameter of not more than 300 Å.

After formation of the dense layer, the sol may further be coated on the inside surface of the dense layer 3 in the same manner as the above, which is then dehydrated into a gel, followed by drying and then baking so that the dense layer can be formed in multiple laminated layers. Alternatively, as previously described, a slurry in which particles with a small diameter have been dispersed may be coated on the inside surface of the support, which is then dried, followed by baking at a given temperature to form a dense layer with a pore size of from 0.05 to 20 μm, on the surface of which the above sol is coated, which is dehydrated into a gel, followed by drying and then baking so that the dense layer can be formed in multiple laminated layers.

In the present embodiment, a ceramic filter with a plural-layer structure has been described. The ceramic filter of the present invention may alternatively have a single-layer structure so long as it has an average pore size of from 0.05 μm to 100 μm. In other words, the ceramic filter may have at least one layer of the layer having an average pore size in the above range.

Results of experiments carried out to examine the relationship between the proportion of alumina in the alumina-zirconia mixed particles and the strength and durability of the product are reported below with reference to FIGS. 4 to 6. An alkali resistance test the results of which are shown in FIG. 5 was carried out by immersing test pieces for 20 hours in an aqueous 20% NaOH solution heated to about 60° C. and thereafter measuring their bending strength.

Figure 4:
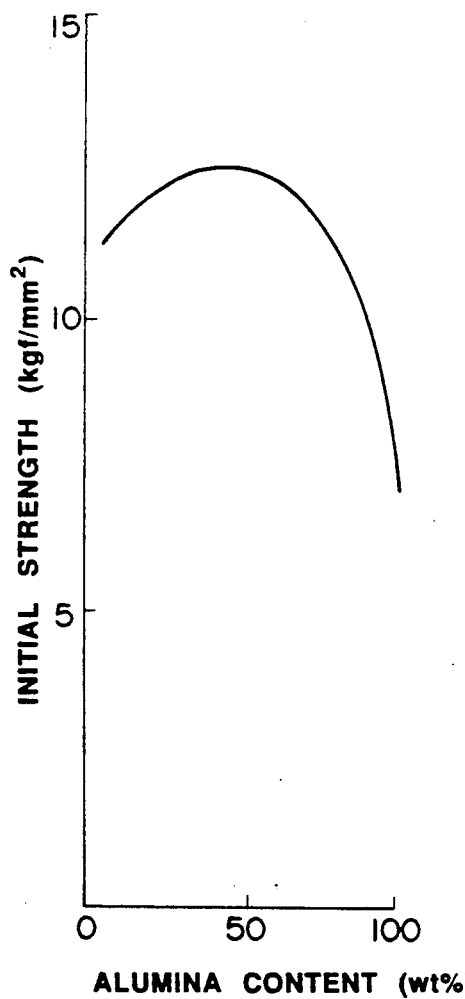
FIG. 4 is a graph to show the relationship between the wt. % of alumina contained in the alumina-zirconia mixed particles and the initial strength of the product.
Figure 5:
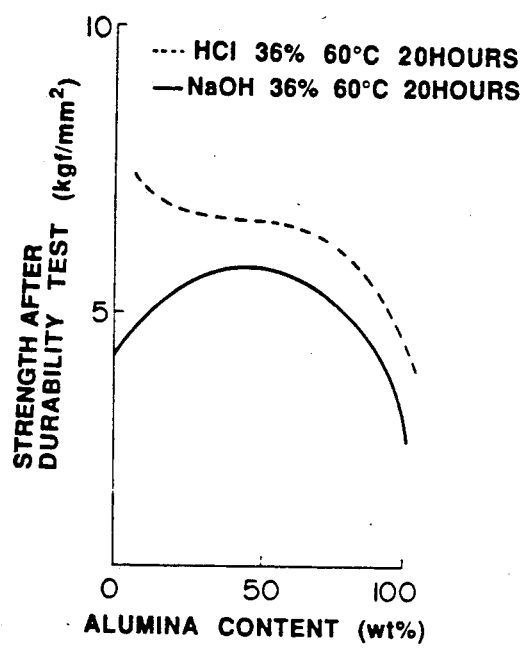
FIG. 5 is a graph to show the relationship between the wt. % of alumina contained in fine particles and the strength after a durability test, of the product.

FIG. 4 is a graph to show the relationship between the wt. % of alumina contained in the alumina-zirconia mixed particles and the initial strength of the product. FIG. 5 is a graph to show the relationship between the wt. % of alumina contained in fine particles and the strength after a durability test, of the product. FIG. 6 is a graph to show the relationship between the wt. % of alumina contained in the whole starting materials including alumina coarse particles and the initial strength and strength after a durability test, of the product.

Figure 6:
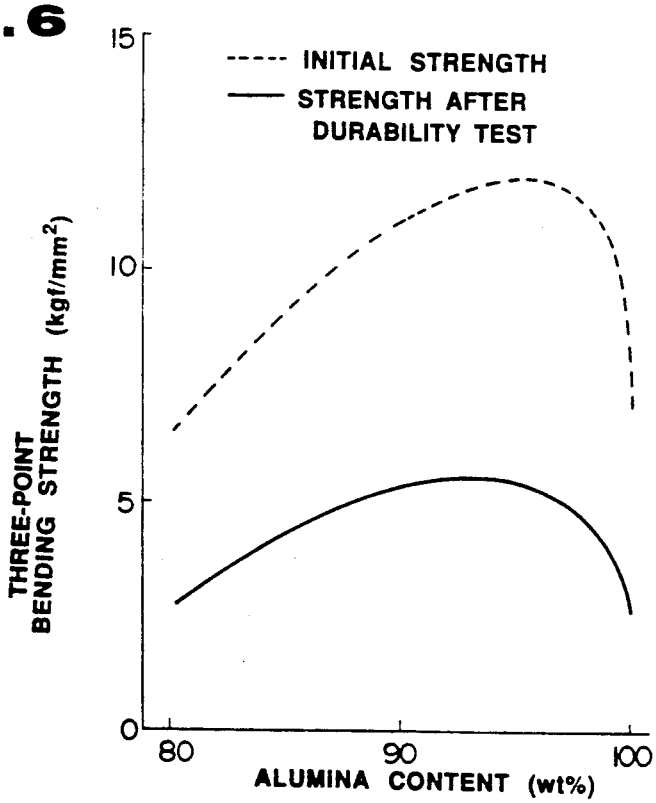
FIG. 6 is a graph to show the relationship between the wt. % of alumina contained in the whole starting materials including alumina coarse particles and the initial strength and strength after a durability test, of the product.

As will be seen from these graphs, it is required for ensuring the strength of products that the alumina contained in the alumina-zirconia mixed particles is controlled to be in an amount of not more than 90 wt. % (FIG. 4) and the alumina held in the whole starting materials including the alumina coarse particles is controlled to be in an amount of from 80 to 99 wt. % (FIG. 6). As will be also seen from FIG. 5, the alumina contained in the alumina-zirconia mixed particles should be controlled to be in an amount of from 20 to 40 wt. % in order to achieve both the alkali resistance and acid resistance. In order to attain a higher strength at a low sintering temperature, the alumina contained in the whole starting materials should be in an amount of from 90 to 95 wt. %.

Figure 7:
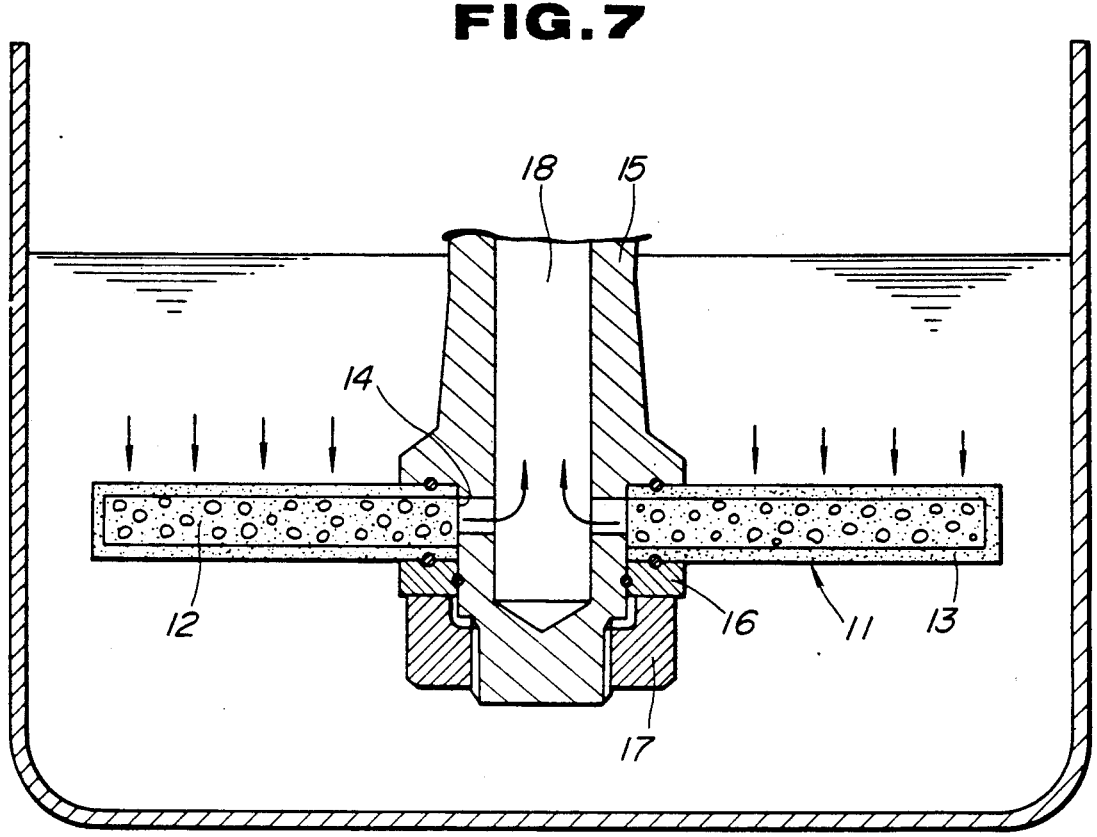
FIG. 7 is a cross-sectional illustration of the state in which a ceramic filter according to another embodiment of the present invention is installed.
Figure 8:
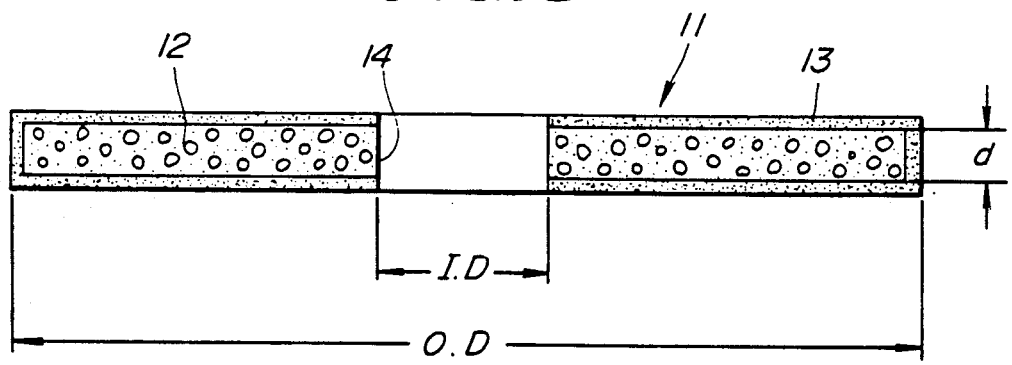
FIG. 8 is a cross-sectional illustration of the filter shown in FIG. 7.
Figure 9:
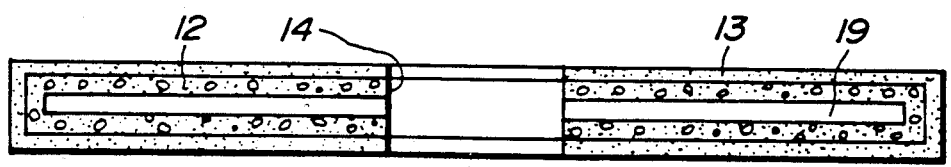
FIG. 9 is a cross-sectional illustration of still another embodiment of the present invention.

Another embodiment of the present invention will be described below with reference to FIGS. 7 to 9.

A ceramic filter 11 is obtained in the same manner as in the embodiment previously described. The ceramic filter 11 is comprised of the inner part comprising a support 12 having a coarse structure with a pore size of from 3 μm to 25 μm and the surface layer part comprising a dense layer 13 having a dense structure with a pore size of from 0.05 to 20 μm or a particle diameter of not more than 500 Å.

The ceramic filter 11 is in the form of a disk and is provided with a through-hole 14 at its center and in its thickness direction. An end of a pipe member 15 is inserted through the through-hole 14. The ceramic filter 11 is fastened with a nut 17 interposing a washer 16 and is thereby fixed to the pipe member 15. A flow path 18 for a filtrate is formed in the pipe member 15. As shown by arrows in FIG. 7, a liquid to be passed through the filter enters into the support 12 through the pores of the dense layer 13 and flows into the flow path 18 of the pipe member 15 through the pores in the support 12. As shown in FIG. 9, a hollow space 19 connected to the through-hole 14 and extending diametrically therefrom may be provided in the support 12 substantially in the middle of the thickness direction.

Figure 10:
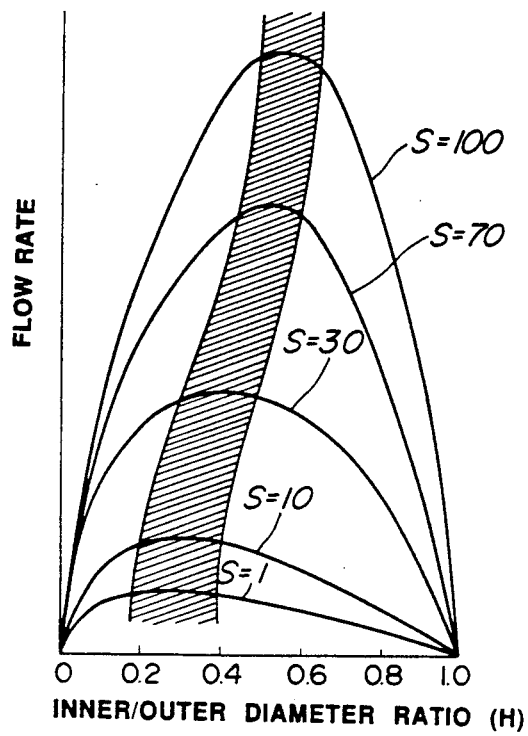
FIG. 10 is a graph to show the relationship between the ratio of inner diameter to outer diameter of a filter and the filtration flow rate, at various specific filtration resistance ratios.

FIG. 10 is a graph to show results of an experiment, in which the filtration resistance ratio per unit length of the support 12 is represented by R ($m^4$/kgf.S), the filtration resistance ratio of the dense layer 13 by r ($m^3$/kgf.S), and the thickness of the support 12 by d (m), where the specific filtration resistance ratio (r/R.d) is represented by S and the ratio (I.D/O.D) of inner diameter (I.D) to outer diameter (O.D) of the flat membrane 11 is represented by H, and where H and S are shown as their relationship to a filtration flow rate.

As a result of the experiment, it was discovered that in order to maintain a strength higher than a certain degree as a flat membrane and at the same time ensure a given flow rate the relationship between S and H should be controlled to be in the hatched range as shown in FIG. 10.

More specifically, the strength as a ceramic filter can be ensured and also a sufficient filtration flow rate can be achieved when the following is set up.

In the case of $1 \leq S \leq 10$, $0.2 \leq H \leq 0.4$.
In the case of $10 \leq S \leq 40$, $0.3 < H \leq 0.5$.
In the case of $40 < S \leq 80$, $0.35 < H \leq 0.6$.
In the case of $80 < S \leq 100$, $0.50 < H \leq 0.65$.

As described above, according to the present invention, a ceramic filter provided with a given pore size and porosity required as a filter membrane and also having superior alkali resistance and acid resistance can be obtained by sintering at a relatively low temperature.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

I claim:

1. A process for manufacturing a ceramic filter, comprising the steps of;
    preparing an aggregate comprising alumina coarse particles and a sintering aid comprising alumina-zirconia mixed fine particles containing not more than 90 wt. % of alumina;
    blending said alumina coarse particles and alumina-zirconia mixed fine particles so that alumina is in an amount of from 80 to 99 wt. % based on the total weight of the starting materials;
    forming the blended starting materials to have a desired shape; and
    sintering the formed product.

2. A process for manufacturing a ceramic filter according to claim 1, wherein said alumina coarse particles have a particle diameter of from 20 μm to 100 μm.

3. A process for manufacturing a ceramic filter according to claim 2, wherein said alumina-zirconia mixed particles have a particle diameter of from 0.1 μm to 0.3 μm.

4. A process for manufacturing a ceramic filter according to claim 1, wherein a sintered body obtained after said sintering has an average pore size of from 0.05 μm to 100 μm.

5. A process for manufacturing a ceramic filter according to claim 1, wherein said step of forming the blended starting materials comprises forming said blended starting materials into a hollow cylinder.

6. A process for manufacturing a ceramic filter according to claim 1, wherein said step of forming the blended starting materials comprises forming said blended starting materials into a round rod provided with a number of through-holes in its longitudinal direction.

7. A process for manufacturing a ceramic filter according to claim 1, wherein said step of blending the alumina coarse particles and alumina-zirconia mixed particles comprises dispersing said alumina-zirconia mixed particles in a liquid to form a slurry, and mixing said slurry and said alumina coarse particles.

8. A sintered ceramic filter having a specified shape and comprising
    a base having an aggregate of coarse alumina particles and a mixture of fine particles of alumina and zirconia
    said fine particles containing 90 weight percent of alumina
    alumina constituting 80% to 90% of total weight of the coarse and fine particles, and
    a dense layer of porous material formed on a surface of said base.

9. A ceramic filter according to claim 8, wherein said dense layer is formed by coating the surface of said support with a slurry comprising a dispersion of particles having a smaller diameter than the particles that constitute said support, followed by drying and then baking.

10. A ceramic filter according to claim 9, wherein said dense layer has a pore size of from 0.05 μm to 20 μm.

11. A ceramic filter according to claim 8, wherein said dense layer is formed by coating the surface of said support with a slurry-like sol comprised of at least one kind of particles selected from particles of $SnO_2$, $TiO_2$, $ZrO_2$ or $CeO_2$ having a smaller diameter than the particles that constitute said dense layer, and forming the sol coating into a gel, followed by drying and then baking.

12. A ceramic filter according to claim 11, wherein the particles that constitute said dense layer has a diameter of not more than 500 Å.

13. A ceramic filter comprising
    a support of a mixture of sintered alumina coarse particles and alumina-zirconia particles,
    said alumina of said alumina-zirconia particles constituting no more than 90% by weight of the mixture,
    said alumina constituting between 80% to 99% by weight of the total weight of the mixture.

14. A ceramic filter according to claim 13 further comprising
    at least one dense layer formed on one surface of said support and having a pore size smaller than the pore size of said support.

15. A ceramic filter comprising;
    a support obtained by sintering starting materials prepared by blending alumina coarse particles and a sintering aid comprising alumina-zirconia mixed fine particles containing not more than 90 wt. % of alumina, so that the alumina is in an amount of from 80 to 99 wt. % based on the total weight of the starting materials; and
    at least one dense layer formed on one surface of said support and having a pore size smaller than the pore size of said support.

* * * * *